United States Patent [19]

Malone et al.

[11] 4,434,067

[45] Feb. 28, 1984

[54] POWDERED CLEANING COMPOSITION

[75] Inventors: Thomas J. Malone, LaGrange, Ga.; Mark E. Ragsdale, Spartanburg, S.C.

[73] Assignee: Milliken Research Corporation, Spartanburg, S.C.

[21] Appl. No.: 286,801

[22] Filed: Jul. 27, 1981

[51] Int. Cl.[3] .......................... C09K 3/22; C11D 3/04; C11D 17/00

[52] U.S. Cl. ..................................... 252/88; 252/89.1; 252/135; 252/140; 252/174; 252/174.14; 252/174.23

[58] Field of Search ................ 252/88, 89.1, 135, 140, 252/174, 174.14, 174.13

[56] References Cited

U.S. PATENT DOCUMENTS

| | | | |
|---|---|---|---|
| 3,630,919 | 12/1971 | Shaaffer et al. | 252/88 |
| 3,819,517 | 6/1974 | Cavazos et al. | 106/18.12 X |
| 4,013,594 | 3/1977 | Froehlich et al. | 252/544 |
| 4,108,800 | 8/1978 | Froehlich et al. | 252/541 |
| 4,161,449 | 7/1979 | Smith et al. | 252/8.6 |
| 4,244,834 | 1/1981 | Schwalley et al. | 252/106 |

FOREIGN PATENT DOCUMENTS 2015972 4/1970 France .

*Primary Examiner*—Michael R. Lusignan
*Attorney, Agent, or Firm*—Terry T. Moyer; H. William Petry

[57] ABSTRACT

A powdered cleaning composition containing a particulate polymeric material, an inorganic salt adjuvant and an aqueous or organic fluid component.

5 Claims, No Drawings

POWDERED CLEANING COMPOSITION

The present invention relates to dry type cleaning compositions and in particular to dry type cleaning compositions which are especially useful for cleaning textile fabrics such as pile fabrics.

Liquid cleaning compositions, such as rug and upholstery shampoos long dominated the market for textile cleaning products. Such liquid compositions, however, are generally recognized to suffer from a wide range of significant disadvantages, such as their tendency to cause shrinking, wicking, matting, etc. Such compositions, furthermore, tend to provide sticky, tacky deposits in the form of detergent residues on the treated fabric substantially increasing the resoiling tendency of the fabric. Application of liquid cleaning compositions to textile substrates such as carpeting may also require protracted drying times prior to resumption of use of the fabric. This required drying time of course may prove to be very inconvenient when the fabric is a carpet and where the carpet is, for instance, in a public thoroughfare as would be the case with commercial establishments such as office buildings, theaters, etc.

Because of the foregoing, well-recognized disadvantages associated with the use of liquid cleaning compositions, substantial efforts have been directed to the development of "dry" type cleaning compositions, that is cleaning compositions which will flow and which can be handled as a powder under conditions of intended use. While such compositions may contain considerable amounts of a liquid such as water and/or organic solvents, in general the amount of moisture in such compositions is such that the disadvantages typically associated with liquid cleaning compositions, such as drying time requirements, shrinking of the substrates, matting, etc., are either avoided or minimized.

A variety of solid materials has been proposed for such compositions, including urea-formaldehyde, polyurethane, polystyrene and phenol-formaldehyde resin particles as in French Pat. No. 2,015,972. In general, however, previous compositions of this type have been limited in their effectiveness in removing soil. More recently, as disclosed in U.S. Pat. No. 4,013,594 to Froehlich, et al (incorporated by reference) the use of particulate, polymeric urea-formaldehyde particles has been proposed for use in providing a "dry" type cleaning composition. While the particulate material employed in the Froehlich patent was distinguished from that of the earlier French patent based upon a fairly broad range of parameters, particular significance was attributed to the fact that, as compared to the particles of the French patent, those of the Froehlich patent in general had a somewhat higher bulk density of at least about 0.2 g/cc. Such higher bulk density characteristics resulted in increased cleaning effectiveness as compared to the particles disclosed according to the French patent (see comparative Example 6 at column lines 15–40 of U.S. Pat. No. 4,013,594).

While such cleaning compositions disclosed in the Froehlich patent have achieved commercial success in the marketplace, several disadvantages have been observed in the product which may have limited that success somewhat. Thus, it has been found that such dry-type cleaning compositions containing, as the solid component of the composition, a solid, particulate, polymeric material having a bulk density of at least about 0.2 g/cc have required the presence in the composition of from about 2 to 100 percent by weight of a cationic antistatic agent to prevent the deposition of minute polymer particles onto the fibers during low humidity conditions that cannot be removed by regular vacuuming. The retention of such particles on the fibers has been observed to result in a shoe dusting problem, that is the particles tend to adhere to the shoes of those walking on the carpet. This problem is discussed in some detail at column 3, lines 45–58 of the Froehlich patent. While the presence of the cationic antistatic agent has reduced or eliminated the problem of polymer particle deposition of such minute particles and the consequent shoe dusting problem, unfortunately such agents tend to expedite the resoiling process and also to decrease oil and water repellency of the fabric substrate which has been cleaned.

Another problem which has been observed in connection with the cleaning compositions of the Froehlich patent is that frequently the urea-formaldehyde particles may break down into smaller particles of less than about 10 microns in diameter, due at least in part to attrition of the particles grinding against one another, especially during the cleaning process. Such small particles may be quite difficult to remove from the fibers of the substrate using conventional methods for removing the soil and the particles, such as vacuum cleaning and brushing. The presence of such particles may cause an objectionable discoloration or "frosted" appearance which may be particularly noticeable on dark-colored articles. It has, therefore, been found to be necessary as disclosed and claimed in U.S. Pat. No. 4,108,800 to provide in the cleaning formulations of the type disclosed in the Froehlich patent from about 0.25 percent to about 5.0 percent of a polyethylene oxide (PEO) having a molecular weight of at least about 20,000. Unfortunately, however, while the presence of the PEO in the cleaning formulation may allow for nearly complete removal of the residual fine polymer particles that were frequently observed to be present after removal of the bulk of the cleaning composition, the presence of PEO may tend to expedite the resoiling process and to decrease both oil and water repellency which is not desired in such cleaning compositions.

Accordingly, the compositions of the present invention provide "dry" type, particulate, polymeric cleaning compositions which have high soil removal capacity, even as compared to those of the prior art Froehlich patent and which also may impart excellent resoiling characteristics as well as oil and water repellency characteristics to the fabric substrate which has been cleaned.

According to the present invention, a powdered cleaning composition is provided consisting essentially of:

(a) about 100 parts by weight particulate polymeric material having an average particle size of from about 37 to about 105 microns in diameter, an oil absorption value of no less than 90, and a bulk density of at least about 0.2 g/cc.

(b) from about 5 to about 400 parts by weight of an inorganic salt adjuvant having an average particle size of from about 45 to about 600 microns in diameter; and (c) from about 5 to about 400 parts by weight of a fluid consisting essentially of 0 to 100 percent water containing sufficient surfactant to give a surface tension of less than about 40 dynes per centimeter and 100 to 0 percent or organic liquid selected from high boiling hydrocarbon solvents, tetrachloroethylene, methylchloroform, 1,1,2-trichloro-1,2,2-trifluoroethane, an aliphatic alcohol containing from 1 to about 4 carbon atoms, and mixtures thereof.

A wide variety of synthetic organic polymers may be used to prepare the polymeric particles employed in the composition of the present invention. Included among the group of satisfactory polymers are polystyrene, urea-formaldehyde resins, polyvinyl chloride, polyacrylics, polyethylene, polypropylene, and acrylonitrile-butadiene-styrene terpolymer. Urea-formaldehyde is preferred.

In general the polymeric particles may have a compact, uniform configuration which results in a bulk density of at least about 0.2 g/cc. The bulk density may be determined by conventional techniques, involving weighing a quantity of particles which fill a calibrated container without packing.

The polymeric particles of the invention may be quite porous and in fact high porosity may be preferred. Porosity of the polymeric particles measured by an oil value as determined by Method D281 of the American Society for Testing may be an oil value of at least 90. Lower oil values may not carry sufficient cleaning fluid. Oil values over 130 are preferred.

Average particle size of the particles should be from about 37 microns to about 105 microns as determined by sieve analysis. In general, particle size distribution should be such that not more than about 10 percent of the particles are larger than about 105 microns and in general no more than about 5 percent of the particles are smaller than about 10 microns. Larger particles do not penetrate carpet material adequately, and use of such particles would result in only superficial cleaning at best. Larger particles also have insufficient surface area to absorb a large amount of soil per unit of weight. If the particles are smaller than about 10 microns in diameter, they may adhere to the individual carpet fibers and have a delustering or dulling effect on the color of the carpet. While particles between about 10 and 37 microns may be tolerated, they may not contribute to cleaning efficiency to any substantial extent so that the average particle size should be in excess of 37 microns.

Particles of satisfactory bulk density, porosity and size may be obtained by a wide variety of polymerization techniques, although ordinarily the mere grinding of a foamed material to a preferred size may not produce a satisfactory product because such comminuted materials may not have appropriate bulk density and oil absorption characteristics to function satisfactorily.

Certain very tough plastics, however, such as the terpolymer formed from acrylonitrile, butadiene and styrene, may be ground to particles having the desired characteristics because they fracture in a manner which produces particles having many jagged edges and high surface area. Existing techniques of polymerization and insolubilization enable the synthesis of porous particles which are sufficiently porous to take up more than their own weight of oil. According to the preferred preparation, urea and formaldehyde may be polymerized in an acidic aqueous mixture containing a little surfactant to give particles exhibiting a high degree of porosity. Such technique is described in U.S. Pat. No. 2,766,283 to Warden (incorporated by reference) except that a urea/formaldehyde ratio of about 0.91/1.0 is used and the pH of the reaction is maintained at about 1.8.

It is to be understood, however, that the invention is not limited to polymeric particles prepared by any particular techinque. Thus, for instance, suspension or precipitation techniques may also be employed with adjustment of conditions to obtain particles of the desired character.

The cleaning composition of the present invention includes in addition to a particulate polymeric material from about 5 to about 400 parts, preferably from about 10 to about 200 parts by weight of an inorganic salt adjuvant.

The parts by weight of inorganic salt which may be employed may include in addition to the weight of the salt per se some associated water of hydration. Such water of hydration is defined herein to include all water that cannot be driven off by heating a 1 to 1.5 gram sample to 110° C. for 2 hours. The inorganic salt may appropriately be referred to as an adjuvant because it may aid or modify the action of the principal ingredients of the cleaning composition, that is the particular polymeric material and fluid component. (See Webster's New International Dictionary, 2d Edition.) Such assistance or aid may be accomplished in the form of increased cleaning efficiency, as improved soil antiredeposition properties in the treated fabric as well as improved oil and water resistance properties of the treated substrate. A wide range of inorganic salts may be employed so long as the salt is characterized as having an average particle size of from about 45 to about 600 microns in diameter. Particles of less than about 45 microns may not be used because retrieval problems may occur. Particles of more than about 600 microns may not be used because cleaning efficiency may be adversely affected. Inorganic salts which may advantageously be used include sulfates, chlorides, carbonates, bicarbonates, borates, citrates, phosphates, nitrates, metasilicates and mixtures thereof. The most preferred inorganic salts are the borate salts.

In preparing cleaning compositions of this invention the cleaning fluid can be water containing sufficient surfactant to lower the surface tension to below about 40 dynes per centimeter, an organic liquid, or mixtures of water, surfactant and organic liquid. Organic liquids which can be used include $C_1$ to $C_4$ aliphatic alcohols, high boiling hydrocarbon solvents and high boiling chlorinated hydrocarbon solvents. The hydrocarbon solvents are generally the petroleum distillates with a boiling point between about 100° C. and about 300° C. Low boiling organic liquids are generally unsuitable from a standpoint of vapors and flammability and higher boiling organic liquids do not evaporate from the carpet fibers at a rapid enough rate.

Representative of commercially available hydrocarbon solvents are Stoddard solvent and odorless hydrocarbon solvent. These solvents usually consist of a petroleum distillate boiling at about 150° to 200° C. Properties of these solvents are comparable to those of British Standard White Spirit and domestic Mineral Spirit. Chemically these solvents consist of a number of hydrocarbons, principally aliphatic, in the decane region. Representative of the high boiling chlorinated hydrocarbon solvents are perchloroethylene, methylchloroform and 1,1,2-trichloro-1,2,2-trifluoroethane. The most preferred organic liquid is a high boiling hydrocarbon solvent.

Surfactants of a number of classes are satisfactory for use in the compositions of this invention. The selection of a surfactant is not critical but the surfactant should serve to lower the surface tension of the water in the composition to about 40 dynes per centimeter or lower. Preferred anionic surfactants are long chain alcohol sulfate esters such as those derived from $C_{10}$–$C_{18}$ alcohols sulfated with chlorosulfonic acid and neutralized with an alkali. Also preferred are alkylene oxide additives of $C_6$–$C_{10}$ mono- and di-esters of orthophosphoric acid. Representative nonionic surfactants that can be used have the formula $$R(O\overset{C_nH_{2n+1}}{\overset{|}{C}}H-CH_2)_mR'$$

where n is 0 or 1, m is 3 to 20, R' is OH or $OCH_3$, R is $C_{12}$ to $C_{22}$ alkyl or phenyl or naphthyl optionally substituted by $C_1$ to $C_{10}$ alkyl groups.

Representative cationic surfactants that can be used are quaternary compounds of the structure $[RNR_1R_2R_3]^+X^-$ where R is $C_{12}$ to $C_{22}$ and includes the commercially important mixtures of alkyls obtained from tallow, hydrogenated tallow and cocoa. $R_1$ and $R_2$ are $CH_3$, $CH(CH_3)CH_2OH$ or $CH_2CH_2OH$. $R_3$ is $CH_3$, $C_2H_5$ or $C_6H_5CH_2$, and X is Cl, Br, I or $CH_3SO_3$.

The surfactant can be a mixture of a nonionic surfactant and either an anionic surfactant or a cationic surfactant. Mixtures of anionic and cationic surfactants are suitable only in carefully selected cases. A preferred composition contains from 1 to 4 percent nonionic surfactant and 1 to 4 percent cationic surfactant. A satisfactory mixture of commercial anionic surfactants comprises (1) 0.4 percent of the sodium salt of a mixture of $C_{10}$–$C_{18}$ alcohol sulfates, predominantly $C_{12}$, (2) 0.4 percent of the diethycyclohexylamine salt of the same sulfate mix, and (3) 0.2 percent of the product formed by reacting a mixture of n-octyl mono- and di-esters of ortho-phosphoric acid with sufficient ethylene oxide to form a neutral product, ordinarily about 2 to 4 moles of ethylene oxide per mole of phosphoric ester. The surfactant is normally used in amounts ranging from about 0.5 to 5.0 percent by weight but useful amounts are not limited to this range.

The minimum proportion of particulate material, e.g., polymeric particles and inorganic salt adjuvant, in the composition is about 105 parts, preferably about 120 parts, per 400 parts by weight of the total composition, as it is difficult to preserve the necessary "dry" character with lower proportions of solid. The fluid portion of the composition may thus form from about 10 percent to about 70 percent of the composition and is preferably from about 20 to about 50 percent by weight based upon the total composition weight. Where the cleaning fluid is a mixture of water and solvent there is no limit on the proportions of each which can be used.

Cleaning compositions of the invention have been found to be very effective for cleaning a wide range of fabric substrates, especially carpet constructions. Cleaning efficiency may be maintained at a very high level even when fairly large amounts of inorganic salt adjuvant, e.g., up to about 400 parts by weight per 100 parts by weight of particulate polymeric material are provided in the composition.

In preparing the cleaning compositions of this invention, best results may be obtained by combining the porous particles with enough of the desired cleaning fluid to almost saturate the particles. Thus it will be seen that a particle with low porosity cannot carry sufficient cleaning fluid to produce a composition having the maximum cleaning power. The precise amount of cleaning fluid used must be determined by trial and error but the oil value can serve as a guide to that amount. Particles having low oil values do not require much cleaning fluid while those of high porosity, i.e., high oil values, require more cleaning fluid. Particles with oil values below 90 cannot carry sufficient cleaning fluid to do a satisfactory carpet cleaning job. The optimum amount of cleaning fluid varies depending upon the properties of the particular particle. The soil substantivity constant aids in the determination of the optimum amount of cleaning fluid that can be used with a given particle.

The mixing can take place in a customary manner using means apparent to those skilled in the art. Alternatively the mixing can take place in situ, by feeding the fluid, polymeric particles and/or inorganic salt adjuvant separately to the carpet and mixing them in the carpet fibers. In the following examples cleaning efficiency of a variety of cleaning compositions within the scope of the present invention was determined using low level, loop, greige carpet which was soiled using a laboratory soil and the Custom Scientific Inc. laboratory soiler. The soiler consisted of a rotation drum having four ports for loading samples. A timer was used to control total cycle time as well as changing direction at a given time. Thirty-six ½" stainless steel balls were used to force the soil into the carpet. The soil is distributed from a bomb over a period of approximately 10 minutes to prevent an uneven application of soil. Ridges found between each port tend to pick the stainless steel balls up from the bottom and carry them to the top of the cylinder where they are allowed to fall to the bottom forcing the soil found on the carpet down into the piles. All samples were soiled for 20 minutes using 0.25 g of the following soil:

38 percent Peat Moss
17 percent Cement
17 percent Kaolin Clay
17 percent Silica
1.75 percent Molacco Furnace Black
0.5 percent Red Iron Oxide
8.75 percent Mineral Oil (Nujol)

After soiling the carpet swatches were vacuumed with 10 strokes using a canister vacuum with power head.

Samples to be cleaned were placed on a carousel that rotates at a constant speed. Placed in a stationary position on the carousel is an oscillating, no-torque floor machine which oscillates at 3400 oscillations per minute and rotates at about 40 revolutions per minute, such as Model 91064, commercially available from Holt Manufacturing Company, Malden, Mass. Also secured at another station on the turntable is a fan used to accelerate the evaportion of the moisture found in the cleaning formulation. One final item placed in position above the carousel is a vacuum cleaner having a rotating pile brush. The carousel is designed to maintain constant scrubbing, drying and vacuuming time. Powder is applied at a given flow rate (based upon the weight of the cleaning formulation). This level of application is maintained constant for all testing. Any differences in cleaning efficiency were the result of the cleaning composition, since all other variables are kept constant. All samples were measured colorimetrically using the Hunter Color Eye. This instrument measures L, which is relative darkness of the sample, e.g., with no reflectance. L equals 0 and with total reflectance L equals 100, etc. Calculation of cleaning efficiency is as follows (samples were measured by the Hunter Color Eye before soiling, after soiling and after cleaning):

$L_o$=L value prior to soiling
$L_s$=L value after soiling
$L_c$=L value after cleaning $$\% \text{ Cleaning Efficiency} - \left[1 - \frac{L_o - L_c}{L_o - L_s}\right] \times 100$$

The higher the percentage, the more efficient the cleaning. $L_o$ was kept constant since all samples were taken from the same carpet. $L_s$ was kept constant as much as possible.

In the following examples, which further illustrate this invention, parts and percentages are by weight unless otherwise stated.

EXAMPLE 1

Two hundred and eighty-three parts of dried urea-formaldehyde polymer were added to a mixing vessel for a Hobart blender. Fifty parts sodium borate decahydrate having a particle size of about 180 microns with no particles smaller than about 53 microns and no particles larger than about 212 microns were added to the vessel as well. Both components were blended at speed No. 1 for 20 minutes. A mixture containing 210 parts water and 13 parts cleaning fluid was added dropwise beginning at the end of the initial 20 minute blending period. The cleaning fluid contained:

Trition X-45—4.95
Lemon Reodorant—0.03
Isopropyl alcohol—8.00
Calcofluor—0.02

The Triton X-45, an alkylarylpolyether alcohol, was purchased from Rohm and Haas. The Lemon Reodorant was purchased from Rhodia, Inc. Calcofluor is an aminocoumarin compound purchased from American Cyanamid Company.

Agitation was maintained until the composition was removed from the blending vessel. Upon completion of the cleaning fluid addition step, blending was continued for 10 minutes at speed No. 1 followed by blending at speed No. 2 for 5 additional minutes. At the end of the blending stage the cleaning compound was tested for cleaning efficiency as described above. A cleaning formulation herein designated Control Formulation was prepared containing no inorganic salt adjuvant and also containing in addition to the above component of Triton X-45, Lemon Reodorant isopropyl alcohol and Calcofluor, about 2 percent of octadecyltrimethylammonium chloride and about 0.3 percent polyethylene glycol (molecular weight greater than 100,000). The results are summarized in Table I.

EXAMPLES 2–8

Examples 2 through 8 were identical to Example 1 except that the ratio on a parts by weight basis of sodium borate to urea-formaldehyde polymer was varied as set forth in Table 1 below.

TABLE I

FORMULATION TABLE (U F POLYMER/BORAX)

| | 1 | 2 | 3 | 4 | 5 | 6 | 7 | 8 |
|---|---|---|---|---|---|---|---|---|
| U F Polymer | 283 | 233 | 183 | 150 | 100 | 67 | 36 | — |
| Borax | 50 | 100 | 150 | 183 | 233 | 266 | 297 | 333 |
| Water[1] | 210 | 210 | 210 | 210 | 210 | 210 | 210 | 210 |
| Cleaning Fluid | 13 | 13 | 13 | 13 | 13 | 13 | 13 | 13 |
| | 556 | 556 | 556 | 556 | 556 | 556 | 556 | 556 |

[1]Water = This figure includes water added as well as certain amounts of water of hydration in excess of that which would be driven off under the conditions defined herein.

TABLE II

CLEANING EFFICIENCY OF BORAX/UF POLYMER BLENDS

| EXAMPLE NUMBER | MEAN CLEANING EFFICIENCY | STANDARD DEVIATION | 95% CONFIDENCY RANGE |
|---|---|---|---|
| 1 | 49.41 | 1.072 | 47.92–50.89 |
| 2 | 40.86 | .934 | 39.56–42 15 |
| 3 | 45.92 | 1.152 | 44.32–47.52 |
| 4 | 44.66 | .801 | 43.55–45.77 |
| 5* | 33.26 | .8357 | 32.10–34.42 |
| 6** | — | — | — |
| 7** | — | — | — |
| 8** | — | — | — |
| Control Formulation | 36.36 | 2.647 | 32.68–40.04 |

*Machine was unable to deliver required amount of compounds thus two passes were necessary.
**Formulations 6 through 8 resulted in non-flowable solids.

EXAMPLES 9–16

Examples 9 through 16 are identical to Example 4 except that sodium borate was replaced with various inorganic salts as summarized below in Table 3.

TABLE III

| EXAMPLE NO. | COMPOUND BLENDED | CLEANING EFFICIENCY | % > 60 MESH | % > 200 MESH | % < 200 MESH |
|---|---|---|---|---|---|
| 9 | Sodium Sulfate | 32.7 | 59.2 | 38.5 | 2.3 |
| 10 | Sodium Nitrate | 39.7 | 56.8 | 50.2 | 3.0 |
| 11 | Sodium Phosphate (Monobasic) | 43.1 | 41.2 | 56.9 | 1.9 |
| 12 | Sodium Bicarbonate | 34.5 | 2.2 | 89.4 | 8.4 |
| 13 | Sodium Carbonate | 26.8 | 59.1 | 39.6 | 2.3 |
| 14 | Sodium Metasilicate | 27.5 | 99.7 | .3 | 0 |
| 15 | Florisil | 35.9 | 0 | 98.1 | 1.9 |
| 16 | Calcium Carbonate | 39.7 | 1.9 | 90.4 | 7.7 |

EXAMPLE 17

A test program was devised wherein 11 participants were provided with a 3.5 pound pail of a cleaning formulation prepared as described in Example 4, together with cleaning instructions and a questionnaire directed to exact square feet of carpet cleaned; brand and type of vacuum cleaner employed to remove the particles; composition of the vacuum cleaner bag (e.g., cloth or paper); amount of prespray used. Other comments directed to, inter alia, observations made after the cleaning process were received. There were no reported difficulties in retrieving dried particulate material from the carpeting, and there were no reports of any shoe dusting problems.

EXAMPLE 18

Example 1 was repeated except that no inorganic salt adjuvant was provided in the composition. The cleaning efficiency was 50.12 (mean) with a standard deviation of 1.499, 95 percent confidency range 48.04 to 52.20. In a cleaning test it was observed that the cleaning composition particles were attracted to and adhered to the working surfaces of the cleaning machine making it unacceptable for application from such machines.

What is claimed is:

1. A powdered cleaning composition having a soil substantivity constant greater than 1.5 and consisting essentially of:

(a) about 100 parts by weight particulate urea-formaldehyde polymeric material having an average particle size of from about 10 to about 105 microns in diameter, an oil absorption value of no less than 90, fiber hardness, and a bulk density of at least about 0.2 g/cc;

(b) from about 5 to about 400 parts by weight of an inorganic salt adjuvant selected from sulfates, chlorides, carbonates, bicarbonates, borates, citrates, phosphates, nitrates, metasilicates and mixtures thereof, having an average particle size of from about 45 to about 600 microns in diameter; and (c) from about 5 to about 400 parts by weight of a fluid consisting essentially of 0 to 100 percent water containing sufficient surfactant to give a surface tension of less than about 40 dynes per centimeter and 100 to 0 percent of a high boiling hydrocarbon solvent.

2. A powdered cleaning composition containing 100 parts by weight of particulate urea-formaldehyde polymeric material having an average particle size of from about 37 to about 105 microns; from about 5 to about 400 parts by weight of an inorganic salt adjuvant selected from sulfates, chlorides, carbonates, bicarbonates, borates, citrates, phosphates, nitrates, metasilicates, and mixtures thereof, and from about 5 to about 400 parts by weight of fluid component consisting essentially of 0 to 100 percent water containing sufficient surfactant to give a surface tension of less than about 40 dynes per centimeter and 100 to 0 percent of a high boiling hydrocarbon solvent.

3. The cleaning composition of claim 1, wherein the average particle size of the polymeric material is from about 35 to about 105 microns.

4. The cleaning composition of claim 1, wherein said inorganic salt adjuvant is a borate.

5. The cleaning composition of claim 2, wherein said inorganic salt adjuvant is a borate.

* * * * *

UNITED STATES PATENT AND TRADEMARK OFFICE
CERTIFICATE OF CORRECTION

PATENT NO. : 4,434,067

DATED : February 28, 1984

INVENTOR(S) : Thomas J. Malone et al.

It is certified that error appears in the above-identified patent and that said Letters Patent is hereby corrected as shown below:

Column 1, line 58, after "column" add --8,--.

Column 4, line 21, after "and" add --the--.

Column 6, line 22, change "rotation" to --rotating--.

Column 7, line 31, change "Trition" to --Triton--.

Column 8, line 18, in Table II, change 39.56-4215 to --39.56-42.15--.

Signed and Sealed this

*Twelfth* Day of *February 1985*

[SEAL]

*Attest:*

DONALD J. QUIGG

*Attesting Officer* *Acting Commissioner of Patents and Trademarks*